(12) United States Patent
Li et al.

(10) Patent No.: US 10,788,704 B2
(45) Date of Patent: Sep. 29, 2020

(54) LIQUID CRYSTAL DISPLAY DEVICE

(71) Applicant: Hisense Visual Technology Co., Ltd., Qingdao, Shandong (CN)

(72) Inventors: Fulin Li, Shandong (CN); Qiang Du, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/714,138

(22) Filed: Dec. 13, 2019

(65) Prior Publication Data

US 2020/0117054 A1 Apr. 16, 2020

Related U.S. Application Data

(63) Continuation of application No. PCT/CN2018/090105, filed on Jun. 6, 2018.

(30) Foreign Application Priority Data

Jan. 26, 2018 (CN) .......................... 2018 1 0076650
Jan. 26, 2018 (CN) .......................... 2018 1 0078975

(51) Int. Cl.
*G02F 1/13357* (2006.01)
*G09F 13/04* (2006.01)

(52) U.S. Cl.
CPC .. *G02F 1/133605* (2013.01); *G02F 1/133603* (2013.01); *G02F 1/133611* (2013.01);
(Continued)

(58) Field of Classification Search
CPC ... G02F 1/133605; G02F 2001/133614; G02F 2001/133607; G02F 2203/01;
(Continued)

(56) References Cited

FOREIGN PATENT DOCUMENTS

| CN | 104698680 A | 6/2015 |
|---|---|---|
| CN | 105425452 A | 3/2016 |

(Continued)

OTHER PUBLICATIONS

International Search Report for corresponding PCT Application No. PCT/CN2018/090105 dated Oct. 8, 2018.

*Primary Examiner* — Joseph L Williams
*Assistant Examiner* — Jose M Diaz
(74) *Attorney, Agent, or Firm* — Brinks Gilson & Lione (57) ABSTRACT

The present disclosure describes a liquid crystal display device. The liquid crystal display device includes a substrate and a plurality of light sources disposed on the substrate and configured to generate excitation light. The liquid crystal display device includes a quantum dot film disposed in a light-emitting direction of the plurality of light sources and a plurality of stereoscopic reflecting plates disposed on the substrate. The liquid crystal display device includes an optical layer disposed between the plurality of light sources and the quantum dot film. The plurality of stereoscopic reflecting plates and the plurality of light sources form a plurality of cavities arranged in an array. The plurality of light sources are located on bottoms of the plurality of cavities respectively. The optical layer is disposed between the plurality of cavities and the quantum dot film, and configured to partially transmit and partially reflect the excitation light. The quantum dot film is configured to be excited by the excitation light to generate excited light.

10 Claims, 9 Drawing Sheets

(52) U.S. Cl.
CPC .............. *G09F 13/0409* (2013.01); *G02F 2001/133614* (2013.01); *G09F 2013/0422* (2013.01)

(58) Field of Classification Search
CPC ... G02F 2202/36; G02B 6/005; G02B 6/0051; G02B 6/0053; G02B 6/0055; F21V 9/30; F21V 9/40; F21V 7/0066; F21V 7/0083; G09F 13/0409; G09F 13/14; G09F 2013/0422; G09F 2013/142; F21Y 2105/00
See application file for complete search history.

(56) References Cited

FOREIGN PATENT DOCUMENTS

| | | |
|---|---|---|
| CN | 107532786 A | 1/2018 |
| JP | 2012174371 A | 9/2012 |
| JP | 2012212509 A | 11/2012 |

…
LIQUID CRYSTAL DISPLAY DEVICE

The present application is a continuation of International Application No. PCT/CN2018/090105, filed on Jun. 6, 2018, which claims priorities to Chinese Patent Application No. 201810076650.2 filed with the Chinese Patent Office on Jan. 26, 2018 and Chinese Patent Application No. 201810078975.4 filed with the Chinese Patent Office on Jan. 26, 2018, which are hereby incorporated by reference in their entireties.

FIELD

The disclosure relates to display technologies and particularly to a liquid crystal display device.

BACKGROUND

With the development of the display technologies, the people's requirements for the display device is higher and higher. The display device includes a backlight module in which the contrast ratio of the light-emitting regions is crucial for the display effect of the display device.

In the related art, in order to achieve the high color gamut display, the backlight module can include a substrate, and a light emitting layer and a quantum dot film arranged successively on the substrate. The light emitting layer includes a plurality of Light Emitting Diodes (LEDs). The backlight module can be the direct-type LED backlight module, and the LED is divided into a plurality of independently-controlled units to form the backlight subareas. The input image can be divided into the image subareas in one-to-one correspondence to the backlight subareas, and the backlight brightness corresponding to each backlight subarea can be modulated in real time according to the image brightness of each image subarea. The quantum dot film includes a plurality of light-emitting regions in one-to-one correspondence to a plurality of LED. Each LED can emit the blue light to its corresponding light-emitting region. The red and green quantum dot materials are arranged in each light-emitting region, and the red and green quantum dot materials can be excited by the blue light to emit the red light and green light towards various directions, so that each light-emitting region emits the red, green and blue light.

SUMMARY

The present disclosure describes embodiments of a liquid crystal display device. The liquid crystal display device includes a substrate and a plurality of light sources disposed on the substrate and configured to generate excitation light. The liquid crystal display device includes a quantum dot film disposed in a light-emitting direction of the plurality of light sources and a plurality of stereoscopic reflecting plates disposed on the substrate. The liquid crystal display device includes an optical layer disposed between the plurality of light sources and the quantum dot film. The plurality of stereoscopic reflecting plates and the plurality of light sources form a plurality of cavities arranged in an array. The plurality of light sources are located on bottoms of the plurality of cavities respectively. The optical layer is disposed between the plurality of cavities and the quantum dot film, and configured to partially transmit and partially reflect the excitation light. The quantum dot film is configured to be excited by the excitation light to generate excited light.

BRIEF DESCRIPTION OF THE DRAWINGS

In order to illustrate the embodiments of the disclosure more clearly, the drawings to be referenced in the description of the embodiments will be introduced below briefly. Obviously the drawings below merely describe some embodiments of the disclosure, and other drawings can also be obtained by those ordinary skilled in the art according to these drawings without any inventive effort.

DETAILED DESCRIPTION

In order to make the objects, schemes and advantages of the disclosure clearer, the embodiments of the disclosure will be further illustrated below in details with reference to the drawings.

With the development of the display technologies, users' requirements for the display effect of the display device is becoming higher. When the contrast ratio between the light-emitting regions of the backlight module in the display device is higher, the display device's display effect is better. Some embodiments of the disclosure provide a liquid crystal display device with high contrast ratio between various light-emitting regions.

Figure 1:
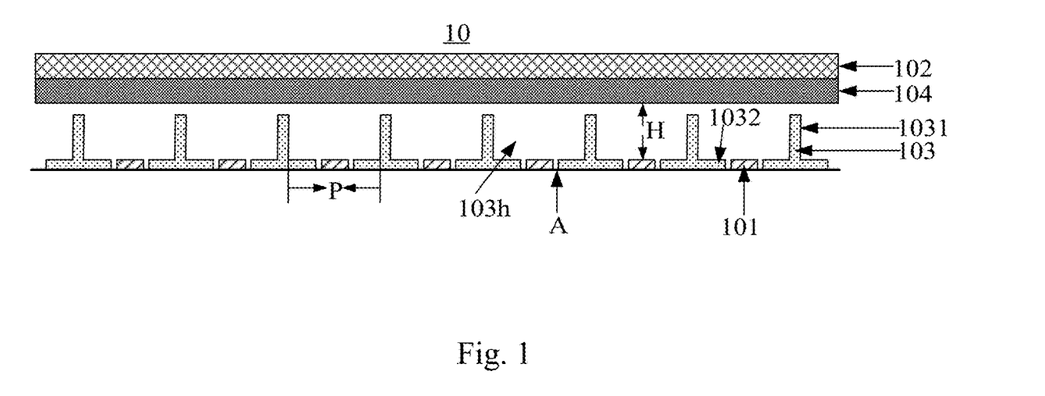
FIG. 1 is a schematic structural diagram of a liquid crystal display device in accordance with some embodiments of the disclosure.

FIG. 1 is a schematic structural diagram of a liquid crystal display device according to some embodiments of the disclosure. As shown in FIG. 1, the liquid crystal display device 10 includes a plurality of light sources 101 and a quantum dot film 102. The quantum dot film is arranged in the light-emitting direction of the plurality of light sources 101.

The excitation light emitting from the plurality of light sources 101 emits onto the quantum dot film 102, and excites the quantum dot film 102 to generate the excited light. The excited light and the excitation light emitting by the light sources 101 can be mixed into the white backlight.

The liquid crystal display device 10 further includes at least one reflecting plate. The reflecting plate can be a stereoscopic reflecting plate 103, which includes a lateral surface 1031 and a bottom surface 1032, and configured to reflect the excitation light emitting from the plurality of light sources 101. A plurality of stereoscopic reflecting plates 103 and a plurality of light sources 101 form a plurality of cavities 103h arranged in an array. The bottom of each cavity 103h is opposite to an optical layer 104, and the plurality of light sources 101 are arranged on the bottoms of the plurality of cavities 103h respectively.

The liquid crystal display device 10 further includes a substrate (not shown in the figure). In one implementation, the plurality of light sources 101 and the plurality of stereoscopic reflecting plates 103 are all arranged on the substrate.

In another implementation, the plurality of light sources 101 or stereoscopic reflecting plates 103 are arranged on the substrate.

An optical layer 104 is further arranged between the light sources 101 and the quantum dot film 102. The optical layer 104 partially reflects and partially transmits the excitation light emitting from the plurality of light sources 101, that is, the optical layer 104 has a certain transmittance for the excitation light. The excitation light emitting from the plurality of light sources 101 is reflected and mixed multiple times in the plurality of cavities 103h due to the reflection of the plurality of stereoscopic reflecting plates 103 and the partial reflection of the optical layer 104, so that the excitation light emitting from the optical layer 104 is more uniform.

In order to ensure the uniformity of the excitation light emitting from the optical layer 104 to meet the display requirement, as shown in FIG. 1, the ratio H/P of the height H of each light source 101 to the optical layer 104 to the width P of each cavity 103h is $0.2 \leq H/P \leq 0.35$ in some embodiments of the disclosure. Here, the width P of one cavity 103h is a distance between two stereoscopic reflecting plates 103 forming the cavity 103h. In this way, a single transmittance m of the optical layer 104 for the excitation light meets $0.25 \leq m \leq 1$.

In some other embodiments of the disclosure, the ratio H/P of the height H of each of the plurality of light source 101 to the optical layer 104 to the width P of each cavity 103h is $0.1 \leq H/P \leq 0.25$. In this way, the single transmittance m of the optical layer 104 for the excitation light meets $0.05 \leq m \leq 0.6$.

The uniformity of the excitation light emitting from the optical layer 104 is excellent and the display requirement of the display device can be met when the ratio H/P of the height H of each light source 101 to the optical layer 104 to the width P of each cavity 103h and the single transmittance m of the optical layer 104 for the excitation light meet the defined relation described above.

For example, the ratio H/P of the height H of each light source 101 to the optical layer 104 to the width P of each cavity 103h and the single transmittance m of the optical layer 104 for the excitation light can be selected as follows: when H/P is 0.2, m is 0.25; or when H/P is 0.25, m is 0.6; or when H/P is 0.35, m is 1.

Or, the ratio H/P of the height H of each light source 101 to the optical layer 104 to the width P of each cavity 103h and the single transmittance m of the optical layer 104 for the excitation light can be as selected as follows: when H/P is 0.1, m is 0.05; or when H/P is 0.2, m is 0.25.

In some embodiments, each light source 101 is an LED and emits the blue light. As shown in FIG. 1, the plurality of light sources 101 may be arranged on the same plane A. The quantum dot film is provided with the quantum dot materials therein, and the quantum dot materials may include the red and green quantum dot materials (the quantum dot materials are not shown in FIG. 1). The red quantum dot material emits the red light under the excitation of the blue light emitting from the plurality of light sources 101, and the green quantum dot material emits the green light under the excitation of the blue light.

The quantum dot film 102 includes the light-emitting regions in one-to-one correspondence to the plurality of light sources 101. When some light-emitting region of the quantum dot film 102 needs to be controlled to emit the light, the light source 101 corresponding to this light-emitting region can be controlled to emit the blue light, to thereby cause this light-emitting region to generate the excited light under the excitation of the blue light. When the blue light emitting from each light source 101 emits onto the light-emitting region corresponding to the light source 101, the lights emitting from the plurality of light sources 101 cannot interfere with each other, to thereby increase the contrast ratio between the plurality of light-emitting regions.

In some embodiments, as shown in FIG. 1, the excitation light emitting from each light source 101 is reflected by the lateral surfaces 1031 of two stereoscopic reflecting plates 103 adjacent to the light source 101 and then irradiates the region on the optical layer 104 corresponding to the light source 101. In this process, the stereoscopic reflecting plates 103 converge the light spots of the excitation light emitting from each light source 101, and decrease the irradiation range of each light source 101. Further, the optical layer 104 reflects a portion of the excitation light to the bottom surfaces 1032 or lateral surfaces 1031 of the stereoscopic reflecting plates 103, and this portion of light is then be reflected multiple times to change the angle of the light, so that the excitation light can be mixed multiple times in the cavity 103h, to thereby increase the uniformity of the excitation light emitting from the optical layer 104.

The following description is a comparison of the illumination uniformity effects when the optical layer 104 is not used and when the optical layer 104 is used under the same condition.

Figure 2A:
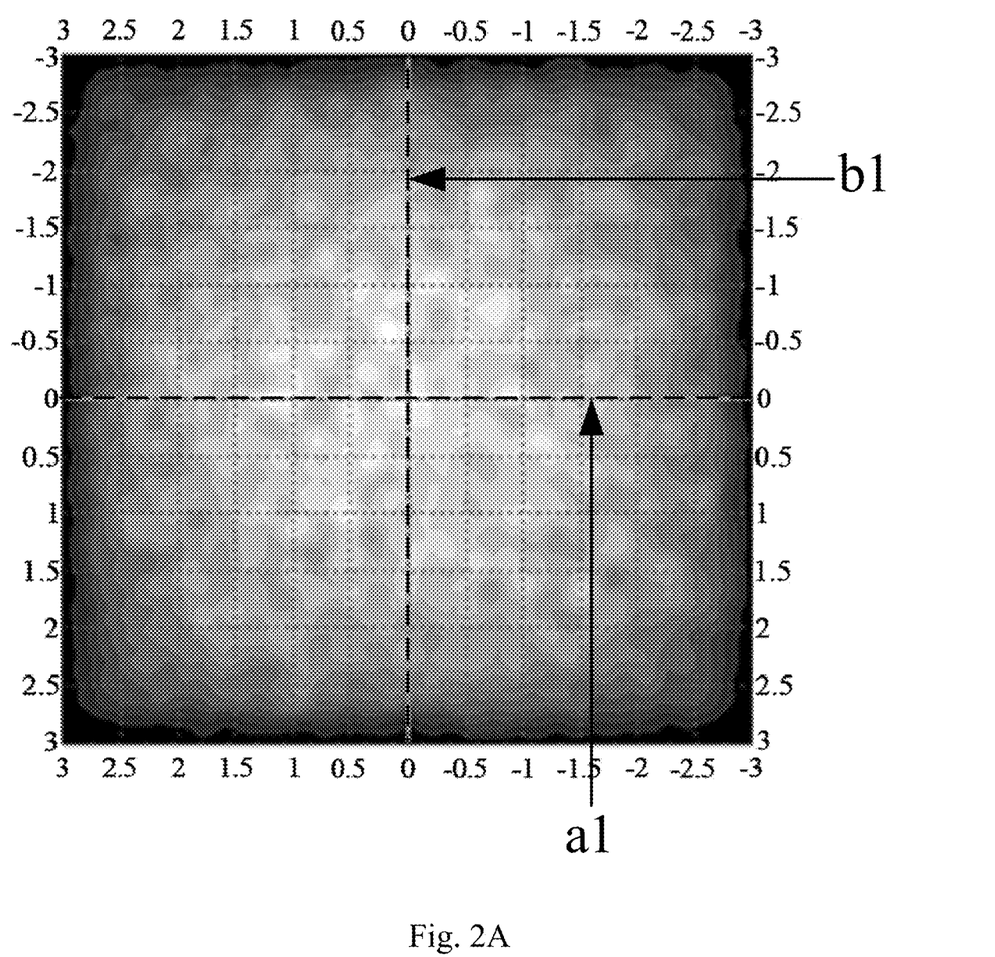
FIG. 2A is a schematic diagram of the illumination distribution of the light-receiving surface of the quantum dot film when no optical layer is used in accordance with some embodiments of the disclosure.
Figure 2B:
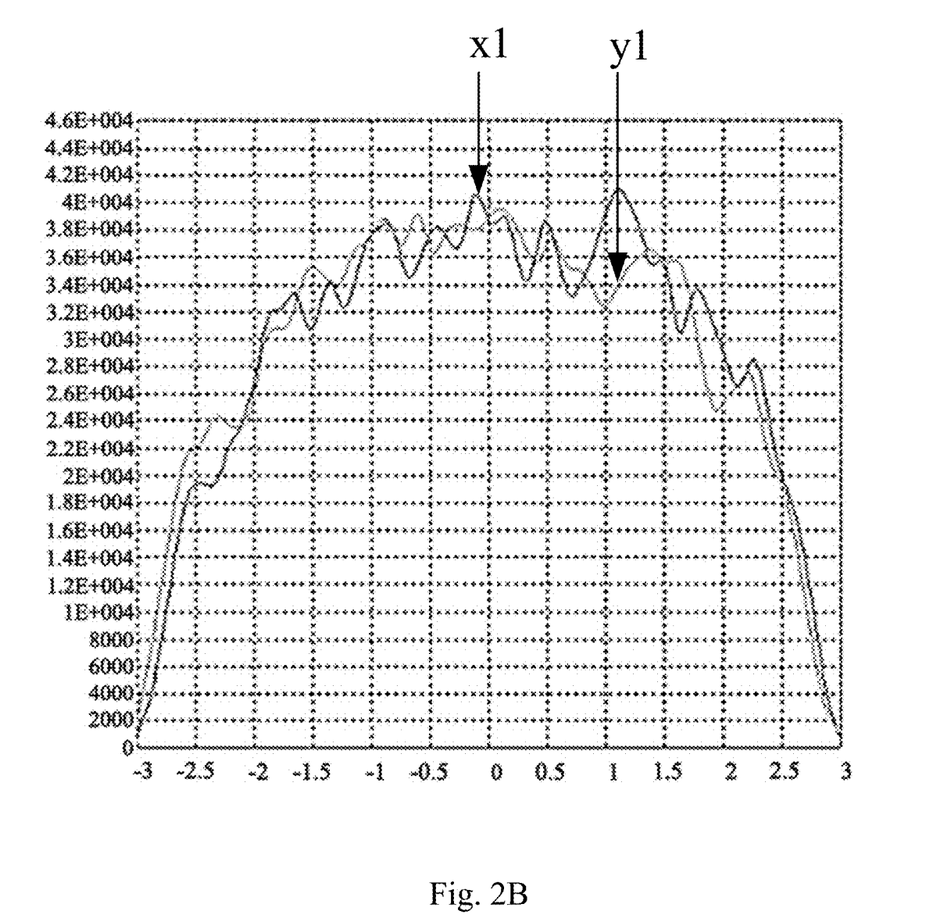
FIG. 2B is a brightness graph of the light-receiving surface of the quantum dot film when no optical layer is used in accordance with some embodiments of the disclosure.

FIG. 2A is a schematic diagram of the illumination distribution of the light-receiving surface of the quantum dot film 102 when the optical layer 104 is not used. The coordinate system in FIG. 2A is the coordinate system created on the light-receiving surface. FIG. 2B is a brightness graph of the light-receiving surface of the quantum dot film 102 when the optical layer 104 is not used. Two brightness curves x1 and y1 are shown in FIG. 2B, the brightness curve x1 corresponds to the brightness in different positions on the abscissa axis a1 in FIG. 2A, and the brightness curve y1 corresponds to the brightness in different positions on the ordinate axis b1 in FIG. 2A. In the brightness graph, the abscissa value of each point in each brightness curve corresponds to the position on the respective coordinate axis in FIG. 2A, and the ordinate value of each point in each brightness curve is the brightness value of this position. For example, the abscissa value of a point on the brightness curve x1 corresponds to the coordinate point of which the abscissa is the corresponding value and the ordinate is 0 in FIG. 2A, and the abscissa value of a point on the brightness curve y1 corresponds to the coordinate point of which the ordinate is the corresponding value and the abscissa is 0 in FIG. 2A.

Figure 3A:
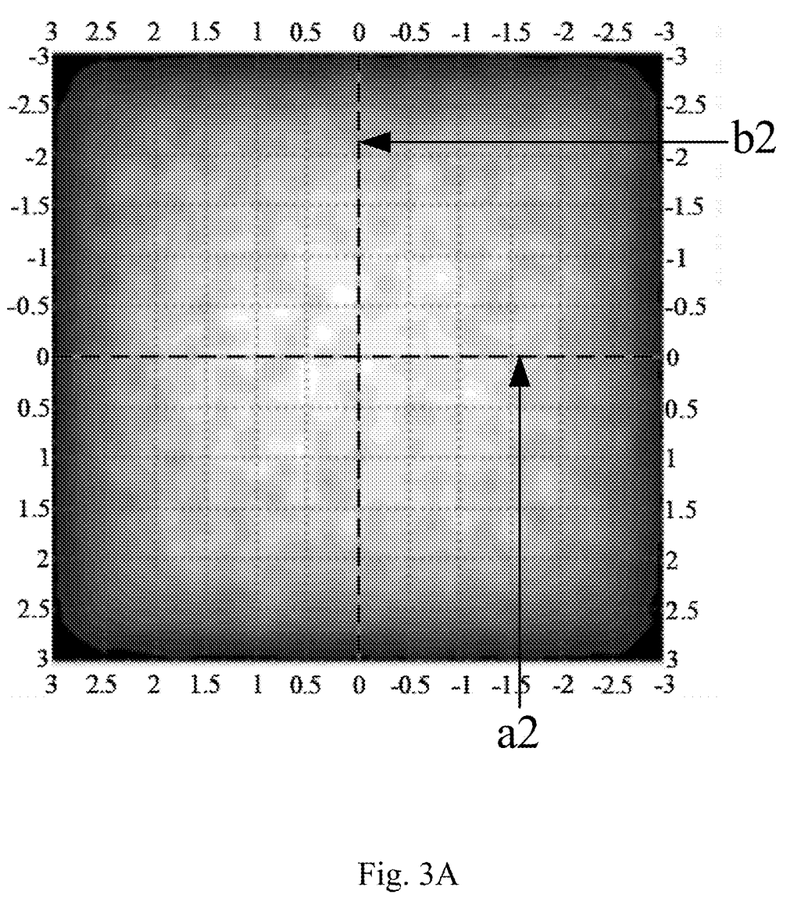
FIG. 3A is a brightness graph of the light-receiving surface of the quantum dot film when the optical layer is used in accordance with some embodiments of the disclosure.
Figure 3B:
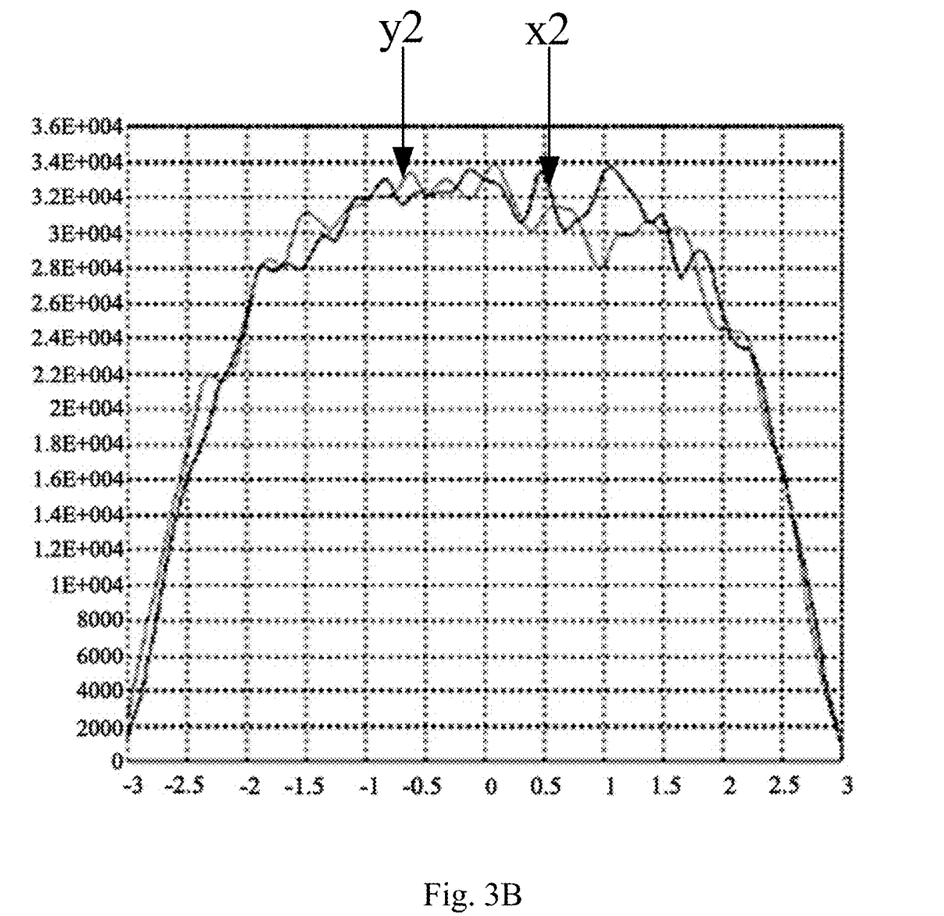
FIG. 3B is a brightness graph of the light-receiving surface of the quantum dot film when the optical layer is used in accordance with some embodiments of the disclosure.

FIG. 3A is a schematic diagram of the illumination distribution of the light-receiving surface of the quantum dot film 102 when the optical layer 104 is used (for example, 0.2≤H/P≤0.35 and 0.25≤m≤1), and the coordinate system in FIG. 3A is the coordinate system created on the light-receiving surface. FIG. 3B is a brightness graph of the light-receiving surface of the quantum dot film 102 when the optical layer 104 is used. Two brightness curves x2 and y2 are shown in FIG. 3B. Here, the brightness curve x2 corresponds to the brightness in different positions on the abscissa axis a2 in FIG. 3A, and the brightness curve y2 corresponds to the brightness in different positions on the ordinate axis b2 in FIG. 3A. In the brightness graph, the abscissa value of each point in each brightness curve corresponds to the position on the corresponding coordinate axis in FIG. 3A, and the ordinate value of each point in each brightness curve is the brightness value of this position. For example, the abscissa value of a point on the brightness curve x2 corresponds to the coordinate point of which the abscissa is the corresponding value and the ordinate is 0 in FIG. 3A, and the abscissa value of a point on the brightness curve y2 corresponds to the coordinate point of which the ordinate is the corresponding value and the abscissa is 0 in FIG. 3A.

As can be seen from the comparisons of FIGS. 2A and 3A as well as FIGS. 2B and 3B, in the most case, the difference between the ordinate values of the points with the same abscissa value on x2 and y2 is smaller than the difference between the ordinate values of the points with the same abscissa value on x1 and y1, which indicates that the excitation light emitting from the optical layer 104 has the good uniformity and the contrast ratio between the plurality of light-emitting regions of the liquid crystal display device 10 is increased under the cooperation of the stereoscopic reflecting plate 103 with the optical layer 104. It should be noted that E+004 represents $10^4$ in FIGS. 2B and 3B. For example, 1.2E+004 represents 12000 and 2.8E+004 represents 28000 in FIG. 2B.

In some embodiments, since the lateral surface 1031 of the stereoscopic reflecting plate 103 may reflect the light and the lateral surface 1031 has the certain thickness, an interval (also referred to as "spacing") can be reserved between the top of each cavity 103h and the optical layer 104 so as to lower the possibility that the dark spots occurs on the optical layer 104 corresponding to the top position of the lateral surface 1031, ensure the uniform distribution of the incident light of the region on the optical layer 104 corresponding to each cavity 103h, and thus ensure the contrast ratio between the light-emitting regions of the liquid crystal display device 10. Here, the top of the cavity 103h is opposite to the bottom, and closer to the optical layer 104 than the bottom of the cavity 103h.

To sum up, the liquid crystal display device 10 according to the embodiments of the disclosure includes the substrate, the optical layer 104, a plurality of light sources 101 and a plurality of stereoscopic reflecting plates 103 arranged on the substrate, and the quantum dot film 102 arranged in the light-emitting direction of the plurality of light sources 101. The plurality of stereoscopic reflecting plates 103 and the plurality of light sources 101 form a plurality of cavities 103h arranged in an array. The plurality of light sources 101 are located on the bottoms of the plurality of cavities 103h respectively, and used to generate the excitation light. The optical layer 104 for transmitting a portion of the excitation light and reflecting the other portion of the excitation light is arranged between the light sources 101 and the quantum dot film 102. The quantum dot film 102 is configured to be excited by the excitation light to generate the excited light. Thus, the excitation light emitting from each light source 101 emits to the light-emitting region on the quantum dot film 102 corresponding to the light source 101 under the action of the stereoscopic reflecting plates 103 and the optical layer 104, to generate the excited light, which significantly lowers the possibility of irradiating to other light-emitting regions on the quantum dot film 102 and achieves the convergence of the light spots of the light sources 101. Meanwhile, the presence of optical layer 104 improves the uniformity of the excitation light emitting from the optical layer 104 and increases the contrast ratio between the plurality of light-emitting regions of the liquid crystal display device 10.

In some embodiments, the optical layer 104 is further configured to reflect the backscattered light of the excited light. The backscattered light is a portion of the red and green lights, generated by the red and green quantum dot materials in the quantum dot film 102 under the excitation of the blue light, emitting to the optical layer 104. In this way, the possibility that this portion of light emitting to the optical layer 104 is reflected again to the quantum dot film 102 and emits out in the direction of the quantum dot film 102 further away from the optical layer 104 can be increased, and the contrast ratio between the plurality of light-emitting regions of the liquid crystal display device 10 is able to be further increased.

In some embodiments, the wavelength range of the blue light is [440 nm, 450 nm], the wavelength range of the red light is [620 nm, 660 nm], and the wavelength range of the green light is [525 nm, 545 nm]. Here and in the present disclosure, "nm" refers to nanometer, i.e., $10^{-9}$ meter; and "[X1, X2]" refer to a range between a value of X1 and a value of X2, inclusive.

Figure 4:
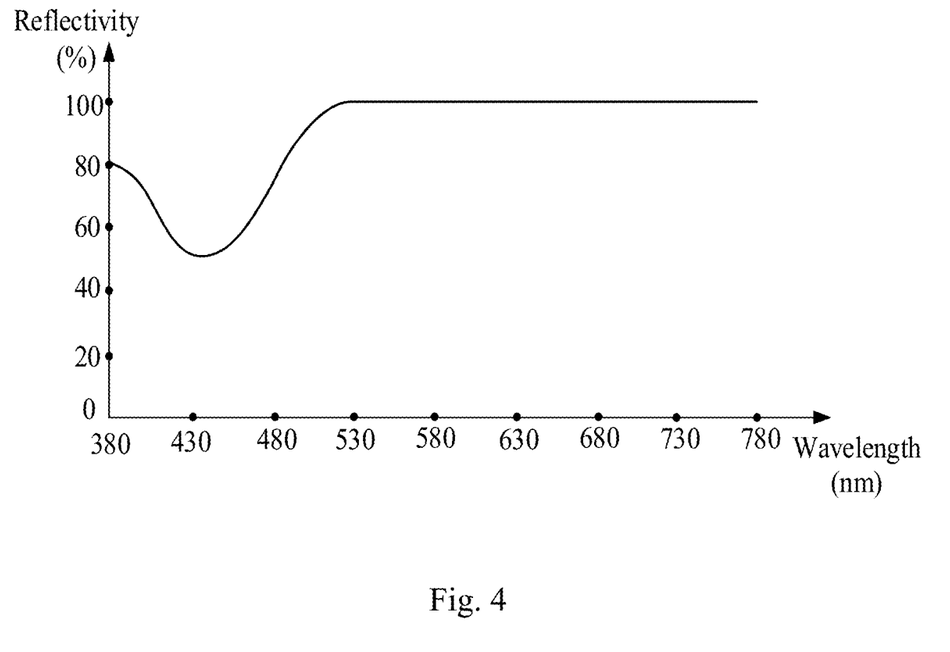
FIG. 4 is a schematic diagram of the relationship of the reflectivity of the optical layer with respect to the wavelength in accordance with some embodiments of the disclosure.

FIG. 4 is a schematic diagram of the relationship between the reflectivity of the optical layer 104 and the wavelength of the light incident on the optical layer 104 in some embodiments. As can be seen from FIG. 4, the reflectivity of the optical layer 104 for the green light (assumed that the wavelength range of the green light is [525 nm, 545 nm]) and the red light (assumed that the wavelength range of the red light is [620 nm, 660 nm]) emitting from the quantum dot film 102 is about 100%, and the reflectivity of the optical layer 104 for the blue light emitting from the LED is about 50%. For one example, the reflectivity for the blue light is 50%. For other examples, the reflectivity for the blue light may not be limited to 50% and may be adjusted as needed. The selection of the reflectivity can be determined based on the transmittance and H/P ratio described above, so as to ensure the light-emitting uniformity of the light-emitting regions.

Figure 5:
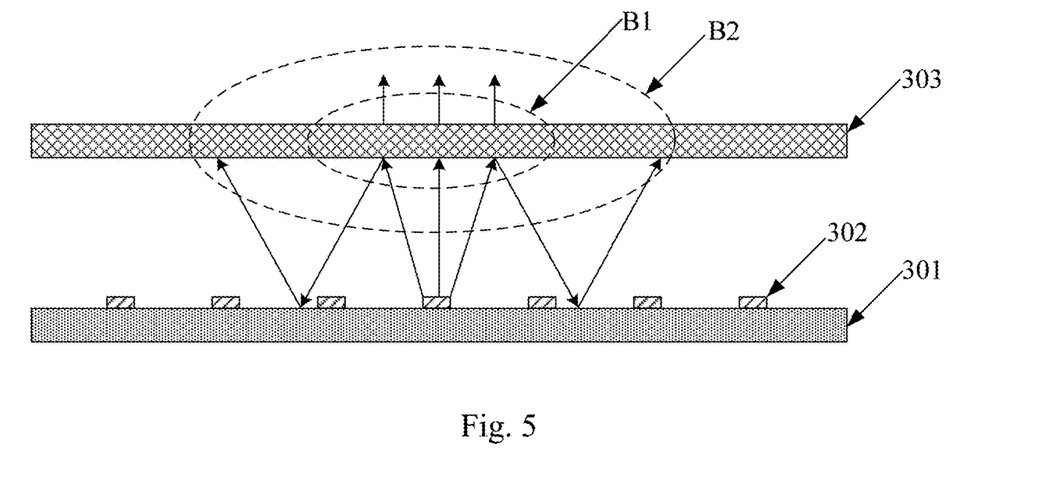
FIG. 5 is a schematic structural diagram of a liquid crystal display device in accordance with the related art.

FIG. 5 is a schematic structural diagram of a liquid crystal display device in the related art. In the related art, the liquid crystal display device can perform area dynamic control (also referred to as local dimming) when emitting the light, e.g., control only one light source to emit the light. The liquid crystal display device can include a substrate 301, blue light sources 302 arranged on the substrate 301, and a quantum dot film 303 arranged at one side of the blue light sources 302 away from the substrate 301. The substrate 301 is provided with the reflecting plate (not shown in the figure) thereon.

As shown in FIG. 5, the expected light spot formed by the quantum dot film 303 under the excitation of the blue light emitting from the blue light sources 302 is B1. However, the excited light generated by the quantum dot film 303 can form the backscattered light after being scattered backward, and the backscattered light is reflected after emitting to the reflecting plate on the substrate 301 and emits to the quantum dot film 303 again. In this way, the light spot formed by the quantum dot film is B2. As can be seen from FIG. 5, the range of the actually-formed light spot B2 is larger than the range of the expectedly-formed light spot B1, so the contrast ratio between the plurality of light-emitting regions of the liquid crystal display device 10 in the related art is relatively low.

However, in the liquid crystal display device 10 according to the above-mentioned embodiments of the disclosure, the optical layer 104 is able to reflect the excited light generated by the quantum dot film 102 and lower the possibility that the excited light emits to the surface where the light source 101 is located, so the difference between the actually-formed light spot and the expectedly-formed light spot is small, to thereby further increase the contrast ratio between the plurality of light-emitting regions.

To sum up, the liquid crystal display device 10 according to the above embodiments of the disclosure includes the stereoscopic reflecting plate 103 and the optical layer 104, wherein the stereoscopic reflecting plate 103 can decrease the angle of emission of the emergent light of the light source 101, and the optical layer 104 partially transmits and partially reflects the excitation light emitting from the light source 101 and reflects the backscattered light of the excited light. Thus, under the action of the stereoscopic reflecting plate 103 and the optical layer 104, the light emitting from the light source 101 emits to the light-emitting region on the quantum dot film 102 corresponding to the light source 101 to generate the excited light, and the backscattered light of the excited light may be reflected by the optical layer 104, lowering the possibility that the light emits to the surface where the light source 101 is located and is reflected by the surface where the light source 101 is located to other light-emitting regions on the quantum dot film 102. In this way, the color mixture of the lights emitting from various light-emitting regions is reduced, and the contrast ratio between the plurality of light-emitting regions of the liquid crystal display device is increased.

Figure 6:
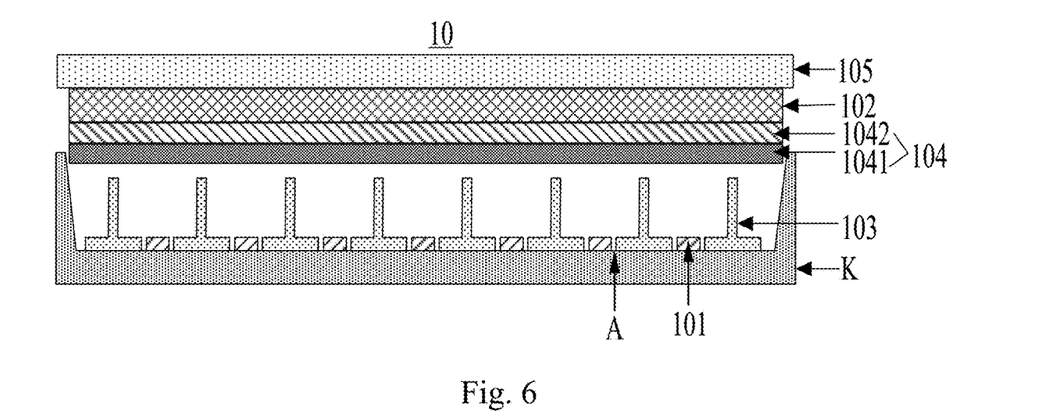
FIG. 6 is a schematic structural diagram of another liquid crystal display device in accordance with some embodiments of the disclosure.

FIG. 6 is a schematic structural diagram of another liquid crystal display device 10 according to some embodiments of the disclosure. As shown in FIG. 6, on the basis of FIG. 1, the liquid crystal display device 10 further includes a light diffusion plate 105 arranged on the side of the quantum dot film 102 away from the light sources 101.

It should be noted that the light diffusion plate 105 is arranged on the side of the quantum dot film 102 away from the light sources 101, and configured to uniformly mix the excited light (i.e., red light and green light) generated by the quantum dot film 102 with the blue light passing the quantum dot film 102. Since the backscattered path of the excited light generated by the quantum dot film 102 is relatively long if the light diffusion plate 105 is arranged between the optical layer 104 and the quantum dot film 102, in the embodiment of the disclosure, the light diffusion plate 105 is arranged on the side of the quantum dot film 102 away from the light sources 101, which can shorten the path of the excited light generated by the quantum dot film 102 emitting to the optical layer 104, so that the light spot formed by the excited light after being reflected on the optical layer 104 is smaller, the color mixture among various light-emitting regions is further reduced, and the contrast ratio between various light-emitting regions is increased.

In some embodiments of the disclosure, the optical layer 104 is able to transmit a portion of the blue light emitting from the light source 101 and reflect the other portion of the blue light emitting from the light source 101. This portion of the blue light reflected by the optical layer 104 is reflected multiple times between the stereoscopic reflecting plates 103 after being reflected to the stereoscopic reflecting plates 103, and then emits from the optical layer 104, increasing the uniformity of the blue light emitting to the quantum dot film 102.

In some embodiments, the optical layer 104 is a half-transmission and half-reflection layer configured to partially transmit and partially reflect the blue light and reflect the red light and green light excited by the blue light.

In some embodiments the optical layer 104 also includes two or more layers, which is not limited by the embodiments of the disclosure. For example, as shown in FIG. 6, the optical layer 104 includes a first optical layer 1401 and a second optical layer 1402. The first optical layer 1401 is arranged close to the light source 101, and is configured to transmit a portion of the blue light emitted by the light source 101 and reflect the other portion of the blue light emitting from the light source 101. The second optical layer 1402 is arranged away from the light source 101, and is configured to reflect the backscattered light of the excited light generated by the quantum dot film 102 and transmit the blue light emitting from the light source 101.

In some embodiments, the stereoscopic reflecting plate 103 includes a base plate parallel to the substrate and a side plate arranged vertically on the base plate. The base plate is fixed on the substrate. The side plate is arranged along the direction from the base plate to the optical layer 104.

In some embodiments, the base plate is provided with a plurality of through holes therein. The plurality of through holes are configured to be passed through by the plurality of light sources 101 arranged on the substrate, to form the independent optical cavities respectively.

In some embodiments, the base plate and the side plate are both of flat plate shape. The flat plate-shaped base plate and the side plate enable the multiple reflections occur in the optical cavities, facilitating the uniformity of the light.

Figure 7:
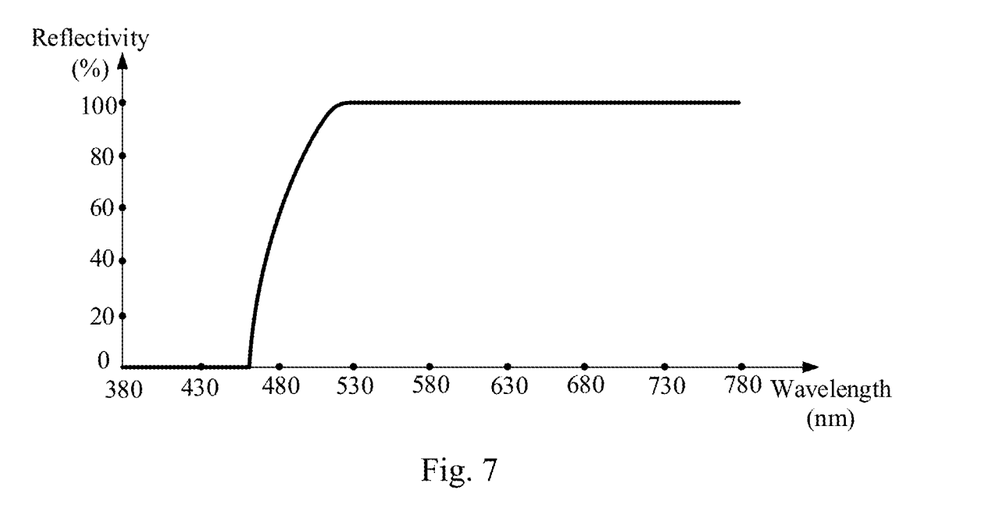
FIG. 7 is a schematic diagram of the relationship of the reflectivity of the second layer with respect to the wavelength in accordance with some embodiments of the disclosure.

FIG. 7 shows the relationship between the reflectivity of the second optical layer 1402 and the wavelength. It is assumed that the wavelength range of the blue light emitting from the light source 101 is [440 nm, 450 nm], the wavelength range of the red light emitted by the red quantum dot material in the quantum dot film 102 under the excitation of the blue light is [620 nm, 660 nm], and the wavelength range of the green light emitted by the green quantum dot material in the quantum dot film 102 under the excitation of the blue light is [525 nm, 545 nm]. As shown in FIG. 7, the second optical layer 1402 transmits the blue light and reflects the red and green lights.

Figure 8:
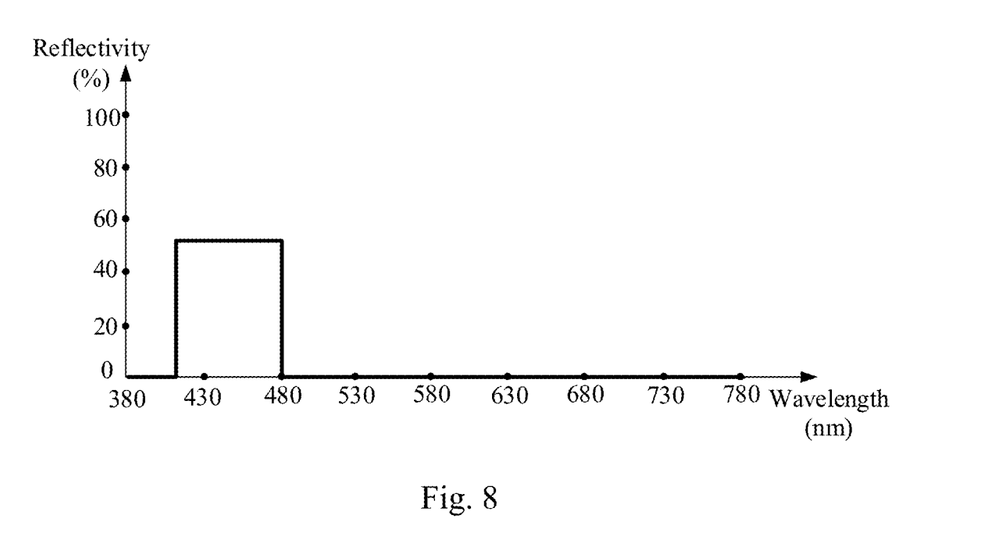
FIG. 8 is a schematic diagram of the relationship of the reflectivity of the first layer with respect to the wavelength in accordance with some embodiments of the disclosure.

FIG. 8 shows the relationship between the reflectivity of the first optical layer 1401 and the wavelength in some embodiments. As shown in FIG. 8, the first optical layer 1401 can perform the half-transmission and half-reflection only on the light of the blue light band ([400 nm, 480 nm]) and transmit the light of other wavelengths outside the blue light band, where the blue light band ([400 nm, 480 nm]) can include the wavelength of the blue light emitting from the light source 110 in the embodiments of the disclosure.

Figure 9:
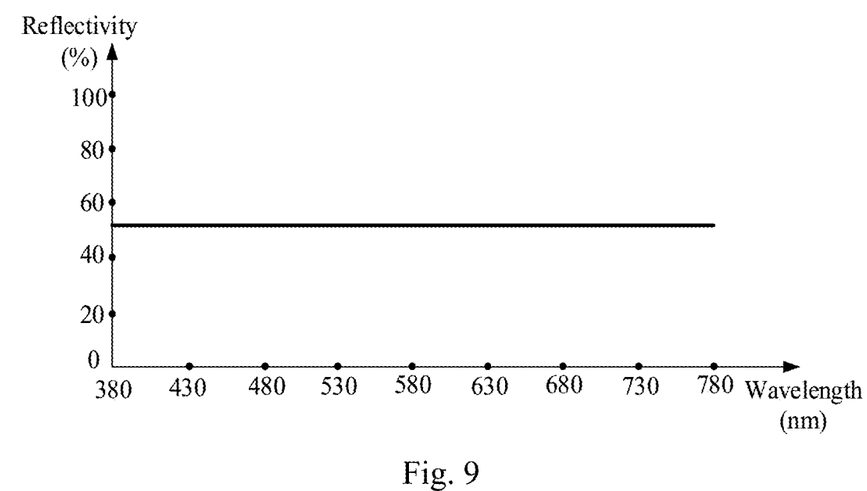
FIG. 9 is a schematic diagram of another relationship of the reflectivity of the first layer with respect to the wavelength in accordance with some embodiments of the disclosure.

FIG. 9 shows the relationship between the reflectivity of the first optical layer 1401 and the wavelength in another embodiments. As shown in FIG. 9, the first optical layer 1401 is able to perform the half-transmission and half-reflection on the light of any wavelength in the visible light band ([380 nm, 780 nm]), where the visible light band ([380 nm, 780 nm]) includes the wavelength of the blue light emitting from the light source 110 in the embodiments of the disclosure.

Further referring to FIG. 6, the liquid crystal display device 10 further includes a substrate K which is of groove shape. A plurality of light sources 101 are arranged in the groove and on a surface A of the groove. A bottom surface of the optical layer 104 is arranged on the substrate K and support the other film layers arranged on the optical layer 104.

Figure 10:
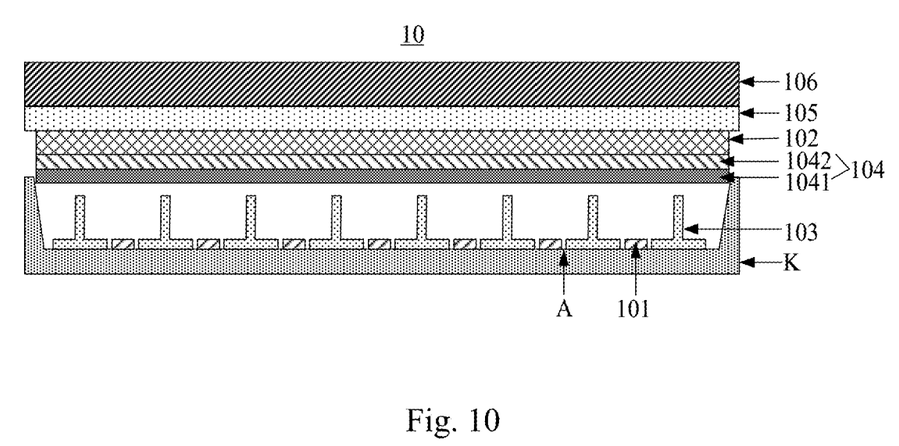
FIG. 10 is a structural schematic diagram of yet another liquid crystal display device in accordance with some embodiments of the disclosure.

In some embodiments, on the basis of the liquid crystal display device 10 as shown in FIG. 1 or 6, the liquid crystal display device 10 further includes an optical film layer. As shown in FIG. 10, for example, on the basis of FIG. 6, the liquid crystal display device 10 further includes an optical film layer 106 arranged on the light diffusion plate 105. The optical film layer 106 includes a Brightness Enhancement Film (BEF) and/or a Dual Brightness Enhancement Film (DBEF). The optical film layer 106 is able to increase the brightness of the light passing through the optical film layer 106.

In some embodiments, the liquid crystal display device 10 further includes a liquid crystal display panel.

For example, the liquid crystal display device 10 may be anyone of the following: a liquid crystal display device, an e-paper, a phone, a tablet, a television, a display, a laptop, a digital photo frame, a navigator, or any other product or component with display functions.

The above description is only the illustrative embodiments of the disclosure and not intended to limit the disclosure. Any modifications, equivalents, improvements and others made within the spirit and principle of the disclosure shall fall within the protection scope of the disclosure.

What is claimed is:

1. A liquid crystal display device, comprising:
   a substrate;
   a plurality of light sources disposed on the substrate and configured to generate excitation light;
   a quantum dot film disposed in a light-emitting direction of the plurality of light sources;
   a plurality of stereoscopic reflecting plates disposed on the substrate;
   an optical layer disposed between the plurality of light sources and the quantum dot film; and
   wherein:
      the plurality of stereoscopic reflecting plates and the plurality of light sources form a plurality of cavities arranged in an array,
      the plurality of light sources are located on bottoms of the plurality of cavities respectively,
      the optical layer is disposed between the plurality of cavities and the quantum dot film, and configured to partially transmit and partially reflect the excitation light,
      the quantum dot film is configured to be excited by the excitation light to generate excited light,
      a ratio H/P of a height H of the plurality of light sources to the optical layer to a width P of each of the plurality of cavities is 0.2≤H/P≤0.35, the width P of each of the cavities is a distance between two stereoscopic reflecting plates forming the cavity, and
      a single transmittance m of the optical layer for the excitation light is 0.25≤m≤1.

2. The liquid crystal display device according to claim 1, wherein:
   the optical layer is further configured to reflect backscattered light of the excited light; and
   the backscattered light is a portion of the excited light emitting towards the optical layer.

3. The liquid crystal display device according to claim 2, wherein the optical layer is a half-transmission and half-reflection layer.

4. The liquid crystal display device according to claim 2, wherein:
   the optical layer comprises a first optical layer and a second optical layer stacked,
   the first optical layer is close to the light sources and configured to transmit a portion of the excitation light and reflect a portion of the excitation light;
   the second optical layer is away from the light sources and configured to reflect backscattered light of the excited light.

5. The liquid crystal display device according to claim 1, further comprising a diffusion plate disposed on a side of the quantum dot film away from the plurality of light sources.

6. The liquid crystal display device according to claim 1, wherein:
   the plurality of light sources comprises blue light sources; and
   the quantum dot film comprises red and green quantum dot materials.

7. The liquid crystal display device according to claim 1, wherein:
   a spacing is reserved between a top of each of the cavities and the optical layer; and
   the top of each of the cavities is opposite to a bottom of each of the cavities.

8. The liquid crystal display device according to claim 1, wherein a first stereoscopic reflecting plate among the plurality of stereoscopic reflecting plates comprises a base plate parallel to the substrate and a side plate disposed vertically on the base plate.

9. The liquid crystal display device according to claim 8, wherein the base plate comprises a plurality of through holes configured to be passed through by the plurality of light sources on the substrate.

10. The liquid crystal display device according to claim 8, wherein:
    the base plate and the side plate are both flat shape.

* * * * *